Figure 1:
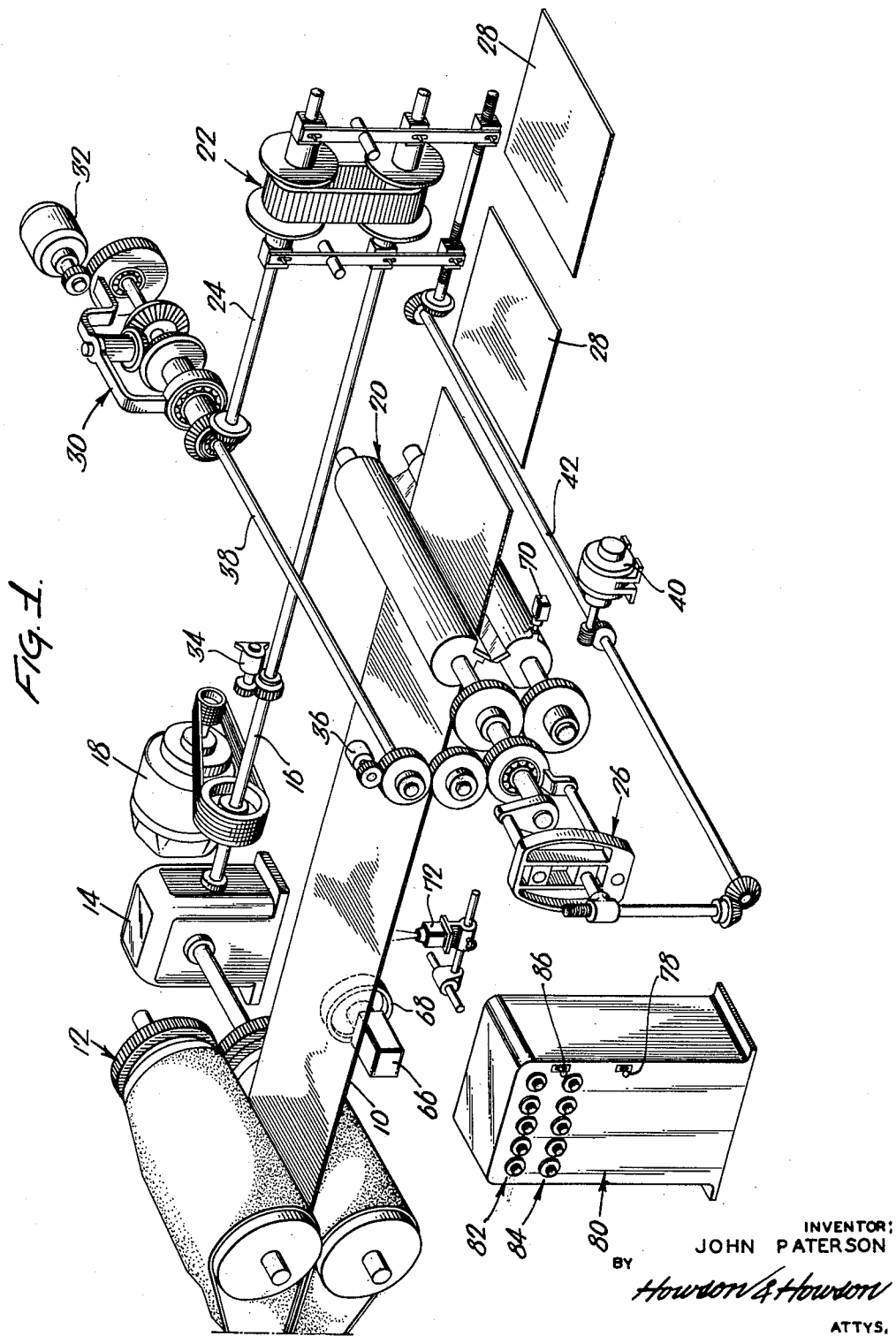

July 20, 1965 J. PATERSON 3,195,385
MACHINE FOR PROCESSING LINEAR MATERIAL
Filed Aug. 28, 1959 2 Sheets-Sheet 1

INVENTOR:
JOHN PATERSON
BY
Howson & Howson
ATTYS.

INVENTOR:
JOHN PATERSON
BY Howson & Howson
ATTYS.

United States Patent Office 3,195,385
Patented July 20, 1965

3,195,385
MACHINE FOR PROCESSING LINEAR
MATERIAL
John Paterson, Springfield, Pa., assignor to Samuel M.
Langston Company, Camden, N.J., a corporation of
New Jersey
Filed Aug. 28, 1959, Ser. No. 836,694
10 Claims. (Cl. 83—76)

The present invention relates broadly to a machine for processing continuously moving linear material at predetermined intervals. More specifically, this invention relates to such a machine in which the relative speeds of a drive means and a processing means are positively controlled in such manner as to insure the proper intervals between the repetitive processing.

Heretofore the accuracy of repetitive processing has been dependent among other things upon how accurately the speed of the feed means can be controlled through its drive means, and how accurately the speed of the processing means can be controlled through its drive means, together with the precision with which the rates of speed can be controlled relative to one another. With improved techniques for printing and other handling of linear material, the demand for more precise repetitive processing machinery has become greater. For example, as will more specifically appear in the application, the demand for a machine for cutting sheet material to precise lengths will enable formation of precision structures from these lengths without further cutting and shaping and with a minimum of material waste.

The present invention accomplishes the desired precision through a means synchronizing the drive means for the feed and the drive means for the processing means. The synchronizing means may operate within a mechanical coupling system, or it may operate within and as part of some other part of a coupling and synchronizing system. In any event, control is provided at the point of synchronization by providing a further drive means to adjust the synchronizing means. This drive means is preferably driven in response to signals developed from monitoring means, monitoring the speeds of the feed means and the processing means respectively. Ordinarily it will be desirable to have separate synchronizing means in parallel for providing coarse and fine adjustment. In a preferred arrangement, a closed loop can be provided between the monitoring means and the drive means, whereby any detection of eror which would result from inexact speeds for the feed and processing means will be developed into a signal for moving the drive means of the synchronizing means.

Further accuracy is possible by monitoring the speed of the linear material, particularly continuous linear material, relative to the speed of the drive so as to ascertain conditions where slippage may occur, and superimposing an error signal developed thereby upon the error signal developed from the monitoring means associated with the feed and processing means. The composite signal will make correction both for slippage and for any inadvertent relative change of speed in the feed and processing means.

An application of the system of the present invention will be described hereinafter with specific reference to a continuous sheet cut-off machine wherein uniform and properly positioned sheet length is obtained. The invention contemplates the application of digital logic to the control of the speed of an adjusting motor which operates to increase or decrease the length of sheet being severed from a continuously moving web such as corrugated board.

The invention more specifically contemplates the cutting of sheets from a continuously moving web of material to an accurate length together with continuous automatic inspection of length and correction, if necessary.

The system of the present invention provides for presetting of a next different sheet length or order which is to be run, and having the machine automatically adjust itself to this new sheet length, when required, and eliminating the necessity of an operator measuring the sheet, adjusting the sheet length and then remeasuring to insure proper sheet length.

The invention also includes means whereby preprinted liners or the like can be accurately cut to a register mark while maintaining continuous automatic running register thereby locating the cut in the correct position with reference to the printing.

The invention provides accordingly, a machine for processing linear material having feed means and repetitive processing means to process the linear material at predetermined intervals, a drive means for the feed means and a drive means for the processing means together with synchronizing means for adjusting the relative speeds of the feed and processing means to insure processing at predetermined intervals along the length of the linear material.

The synchronization is obtained by utilizing in an appropriate circuitry a first sensing element for sensing the speed of the feed means and producing a signal proportional thereto, a second sensing element for sensing the speed of the processing means and producing a signal proportional thereto, and similar signal affected means associated with each sensing element for producing effects which can be compared. Comparison means are coupled to the signal affected means for comparing the produced effects and produce error signals in the event of deviation from a predetermined standard of comparison which obtains when the processing is occuring at the predetermined intervals and drive means coupled to the synchronizing means and responsive to error signals to cause adjustment of the synchronizing means. Adjustment of the synchronizing means results in correction of the relative speeds of the feed means and the processing means to assure processing at the desired correct predetermined intervals.

Figure 2:
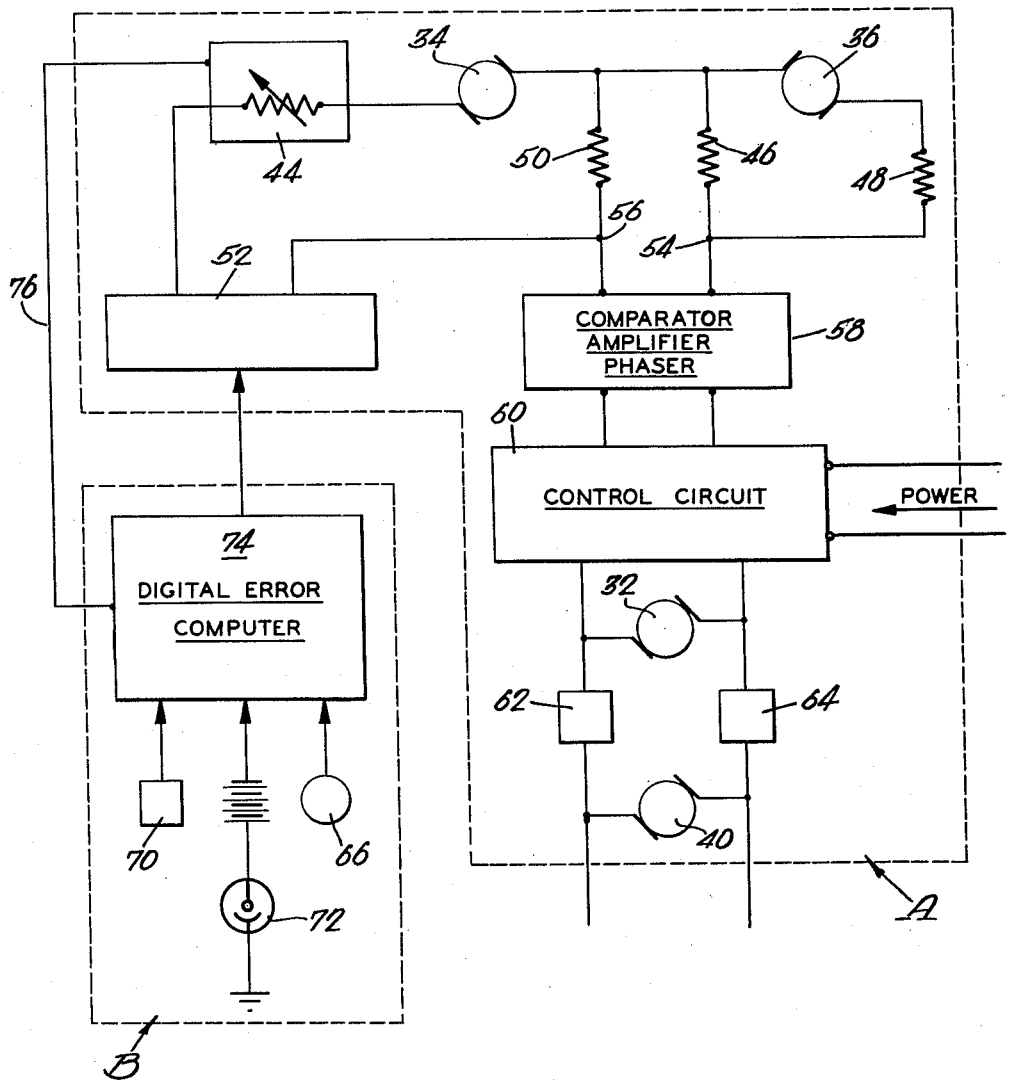

Additional features and advantages of the present invention and the structure and operation thereof will be more readily apparent from the following detailed description of an embodiment thereof when taken together with the accompanying drawings in which:

FIG. 1 illustrates in perspective, a schematic arrangement showing essential elements in a continuous sheet cut-off machine whereby uniform sheet length may be obtained; and FIG. 2 is a block diagram of computer links which may be employed between the speed monitoring means and the correction or synchronizing drive means.

Application of the present invention will be explained with relation to a sheet cut-off mechanism schematically shown in FIG. 1 and only in such detail as to present an understanding of the invention. A continuously moving web of material 10 is continuously fed from a double facer mechanism 12 of a usual type, in a known manner. The double facer is driven through transmission 14 and main drive shaft 16 which in turn is driven by main drive motor 18. A usual known type of cut-off means consists in knife cylinders 20. A variable speed transmission shown here as consisting of a Reeves drive is shown at 22 which is operatively connected at its input end with main drive shaft 16. The output of the Reeves drive is connected by drive shaft 24 to a crank mechanism 26 of a type shown and described in Behrens Patent No. 2,389,341 and has as its purpose to produce a knife velocity equal to the velocity of the web while the blades are in contact with the web. The sheet length of the cut sheets 28 is equal to the web advance during one revolution of the knife cylinders 20 and is established by adjusting the ratio of the variable speed Reeves drive type transmission 22. Any slippage which occurs between the web and the double facer which feeds the same, slippage of the Reeves belt drive, and incorrect setting of the Reeves ratio will produce an error in the sheet length. A differential gear train broadly designated 30 has been inserted on the shaft between the crank mechanism 26 and the Reeves drive output shaft 24. An electric motor 32 is adapted to drive the arm of the gear train carrying the planet gears of the differential. Counterclockwise rotation of this motor is adapted for increasing the knife cylinder average velocity, thus making the sheet length slightly shorter. Clockwise rotation will decrease the knife cylinder average velocity, thus increasing the sheet length. The amount of increase or decrease in the sheet length is proportional to the speed of motor 32.

The main line drive shaft 16 is a common drive connecting the cut-off to the double facer or web feeding machine, thus assuring the same driving speed to and on both machines. Shaft 16, and consequently the double facer and the cut-off, are as pointed out hereinbefore driven by a main drive motor 18. A tachometer generator 34 is geared to and driven by the line shaft 16. The output voltage of generator 34 is directly proportional to its speed. Since generator 34 and the web are driven by the line shaft, the voltage of this generator is directly proportional to the web speed, providing no slippage occurs.

A second tachometer generator 36 is geared to and is driven by input shaft 38 to the knife cylinder crank mechanism 26. The output voltage of the generator 36 is also directly proportional to its speed. Since generator 36 and the knife cylinders share a common drive, the voltage output of generator 36 will be proportional to the average speed of the knife cylinders. As will appear hereinafter, with reference to a description of the circuitry involved, at a constant web speed, the voltage of generator 34 will be constant. At this same constant web speed, the voltage of generator 36 will be inversely proportional to the sheet length, that is, at a short length the knife cylinder and generator speed will be greater than on a long sheet length. Adjustment of sheet length through the Reeves drive is accomplished by means of motor 40 operating through shaft 42 which interconnects the Reeves drive 22 and crank mechanism 26 as shown.

To maintain proper sheet length, computers are employed. A block diagram of the computer circuitry appears in FIG. 2. The circuitry may be subdivided into analog and digital portions, the analog circuit appearing within the enclosure A formed by one set of dashed lines and the digital circuit appearing within the enclosure B formed by another set of dashed lines.

The analog computer is effective to compare the speeds of the double facer 12 or other sheet drive and the cut-off rolls 20 and to detect deviations from relative speeds which would produce inaccuracies in a preselected sheet length. The digital computer is an overriding error detection and correction device which acts upon the analog computer to correct errors arising from causes other than inaccuracies in speeds of the double facer and cut-off rolls. Correction is accomplished by differential drive motor 32 and Reeves drive shifter motor 40.

The computer circuitry also serves to provide a convenient location for a sheet length adjustment selector 44. In practice, this may require a highly precise variable resistor in a relatively complicated arrangement. The resistor 44, however, may be directly calibrated in terms of sheet length and sheets of the desired length will be produced merely as the result of this setting.

As previously explained, the output of tachometer 34 indicates the speed of the drive, double facer 12, whereas tachometer 36 indicates the speed of the cut-off rolls 20. Referring first to the analog computer circuitry, it will be observed that each of the tachometers 34 and 36 is in circuit in a resistance loop. Tachometer 36 is in a loop formed by fixed resistance elements 46 and 48, each of which is preferably highly precise. In the loop with the tachometer generator 34 are also resistors. A fixed resistor 50, corresponding in position to resistor 46, and variable resistors 44 and 52 are employed. The effect of the resistors in each loop is to limit the current flowing through the loop and to provide a voltage drop from one terminal of the tachometer generator to the other. Thus it will be appreciated that changes in the resistance of variable resistors 44 or 52 will affect the currents produced at a particular speed and the distribution of voltage drop around the loop. The voltage across the tachometer generator for a particular speed is, of course, fixed.

The direct current output of tachometer generator 34 is directly proportional to web speed (per line shaft 16 and double facer 12) provided no slipping occurs. The direct current output of tachometer generator 36 driven by input shaft 38 to the knife cylinders 20 is proportional to the average speed of the knife cylinder. Thus, assuming no slipping, when the web and the knife speeds are proper for the cutting the sheet to the predetermined length, no error signal should be generated. The circuits are so designed that if the relative speeds of the tachometer generators 34 and 36 would indicate no error in sheet length essentially the same voltages will be produced at terminals 54 and 56. Conversely a difference in voltages at terminals 54 and 56 indicates sheet length error. It can therefore be appreciated that a change in resistance at 44 or 52 will change the voltage distribution of its loop at a given speed including the voltages at terminals 54 and 56. To re-balance the voltages, an adjustment in either, or both, double facer and knife speed is required, and voltage balance at terminals 54 and 56 will occur for a different sheet length. This is the mechanism of length adjustment by resistor 44.

The voltages at terminals 54 and 56 are compared by voltage comparator 58. The circuits are designed with parameters such that the voltage difference at terminals 54 and 56 not only indicate error and the direction of error, but the amount of error. If the voltage at terminal 54 is higher than the voltage at terminal 56, a signal will be supplied control circuit 60 through the amplifier and phaser of comparator 58 which drives differential drive motor 32 in the direction to correct the error. If the sheet length is shorter than specified by the setting of resistance 44, the voltage at terminal 56 will be lower than that at terminal 54. Conversely, if the sheet length is too long, the voltage on terminal 56 will exceed the voltage at terminal 54.

Ordinarily where there is no change in resistance 44, the correction motor 40 of the Reeves drive will not be affected. However, whenever the signal reaches a predetermined size, relay elements 62 or 64, depending upon the direction of the required correction as indicated by its polarity, actuate the motor 40 to adjust the Reeves drive 22. This type of correction is required to correct for a major change in the preselected sheet length.

From the above, it will be seen that in the analog computer the tachometer voltage outputs are proportional to the speeds of the elements with which they are driven in synchronism, and the voltage across terminals 54 and 56 are analogous to the error in the system.

Despite the fact that the double facer and the cut-off rolls 20 may be in perfect synchronism to produce the desired sheet length, slippage between the double facer 12 and the web 10 can cause error. The digital computer is intended to compare signals which will detect such errors and then produce a signal which will, in turn, make the correction.

Detection of web speed is made by a rotary transducer type tachometer generator 66 driven by impulse wheel 68 driven by web 10, and detection of knife speed is made by a photoelectric cell or impulse transducer 70 which detects a particular point on the periphery of one of the rollers each revolution. Additionally, if printed matter is to be located relative to the knife edge, a photoelectric detection means, such as 72, may be employed. These detection means advantageously are adapted to be compared in such a way that almost any instantaneous detection and correction is possible. A preferred method of doing this is using a pulsed signal in which the number of pulses per unit time is varied and, in turn, varies a binary operator. In order to synchronize the digital computer 74 with the preselected sheet length, a setting of resistor 44 may be fed through connection 76 to digital computer 74. Preferably, deviation from the desired length effects a binary storage system in such a way that it acts upon relays in turn effecting resistance 52. These relays may, by a binary technique, change the resistance in very small increments, sufficiently small relative to the accuracy of the system, to permit close adjustment of error. Change in resistance 52, like change in resistance 44, changes the effective loop resistance in series with tachometer generator 34 and, therefore, changes the voltage at 56. If the system is otherwise in balance, the change in voltage at 56 generates an error signal by its effect upon comparator 58 which, in turn, causes motor 32 to introduce a correction which tends to bring the voltage at 56 back to the voltage at terminal 54. Thus, once set in the system, resistor 52 does not alter the operation of the system.

When cutting preprinted liner, to maintain the cut in register with print marks, a switch 78 on control panel 80 is moved to a preprinted liner position. The distance between printed register marks (sheet length) is set on either row of sheet length selector switches 82 or 84, with toggle switch 86 in proper position for the selected row of switches 82 or 84. With the switch 78 in the set position it will not effect the sheet length set up but only set the apparatus in operation as aforesaid.

In preprint operation, pulses from 72 and 70 will be in coincidence when the sheet length and location of cut are correct. If an error in location of cut exists such that the pulse from 72 precedes a pulse from 70, pulses from 66 to the computer would be doubled until the pulse from 70 occurred. The doubling of these pulses from 66 during this interval will produce the same effect as having cut a sheet too long and would so adjust the mechanism to correspondingly cut the next sheet shorter. This would result in bringing the pulses of 70 and 72 into coincidence. If the pulse from 70 preceded that from 72 then the pulses from 66 would be blocked by the pulses from 72 and 70 thereby producing the same effect as a sheet cut too short and adjusting the mechanism so that the next sheet will be cut longer. This would again bring pulses from 70 and 72 into coincidence and the cut into the proper location.

While a single embodiment of the invention has been shown and described as applied to a sheet cut-off machine, manifestly minor changes in details and application of the invention are possible within the spirit and scope of the invention as defined in the appended claims.

I claim:

1. In a machine for processing linear material having feed means and repetitive processing means to process the linear material at predetermined intervals, main common machine drive means for said feed means and said processing means, first and second drive means for the feed means and the processing means respectively, connected to and driven by said main drive means and synchronizing means connected to and driven by said main drive means and operatively connected to and adapted for automatically and continuously adjusting the relative speeds of the feed and processing means to assure processing at predetermined intervals along the length of the linear material, a first sensing element for sensing the speed of the feed means and producing a signal proportional thereto, a second sensing element for sensing the speed of the processing means and producing a second signal proportional thereto and similar to the first signal, similar signal affected analog means associated with each sensing element for producing effects which can be compared, comparison means coupled to the signal affected means for comparing said effects and producing error signals in the event of deviation from a predetermined standard of comparison which obtains when the processing is occurring at the predetermined intervals, and drive means coupled to the synchronizing means and responsive to error signals to cause adjustment of the synchronizing means such that the relative speeds of the feed means and the processing means will be corrected to assure processing at the predetermined intervals.

2. In the machine control system of claim 1 an adjustable element in the signal affected analog means to change the conditions which exist in at least one of the signal affected means so that processing at a different predetermined interval will produce the predetermined standard of comparison and deviation from the new predetermined interval will produce an error signal.

3. In a machine in accordance with claim 2 a second synchronizing means operatively connected to and adapted for producing gross adjustments in the relative speeds of the feed and processing means, drive means coupled to the second synchronizing means adapted to cause adjustment of the synchronizing means such that relative speeds of the feed means and the processing means will be corrected to assure processing at predetermined intervals, and actuating means for the drive means preventing said second drive means from being actuated in either direction until the error signal reaches a predetermined size.

4. The system of claim 1 in which the first and second sensing elements are tachometer generators which produce a voltage proportional to their speed, the drive means coupled to the synchronizing means is a motor adapted to rotate in either direction and at a speed responsive to error signals, and the intermediate elements are electrical circuitry.

5. The system of claim 4 in which the signal affected means associated with each tachometer generator is a resistance loop, and one of said resistance loops contains a variable resistance element which, by changing the voltage conditions in the loop, changes the conditions producing balance.

6. The system of claim 5 in which a gross adjustment means for changing the synchronizing means to adjust the relative speeds of the feed and processing means is provided by an electric motor operatively connected to the drive means for the feed and processing means, and relay means is provided whereby the motor is not actuated until error signals from the control circuit exceed a predetermined amount.

7. A control circuit for use with a machine for repetitive processing of linear material having feed means, repetitive processing means, and synchronizing means operatively connected to and adapted for automatically and continuously adjusting the relative speeds of the feed and processing means comprising a feed means speed detector for association with the feed means to produce an output proportional to the speed of the feed means, a processing means speed detector for association with the processing means to produce an output proportional to the speed of the processing means, separate analog systems receiving the outputs of each speed detector and producing a speed effect, comparison means coupled to each of the analog systems to compare conditions at a particular point within each system and produce an error signal indicative of the direction of error if speed signal conditions depart from a predetermined level at said points and correction means connected to the comparison means and connectable to the synchronizing means for adjusting the relative speeds whereby the correction means drive said synchronizing means to correct the relative speeds.

8. The system of claim 7 in which the speed detectors are each tachometer generators driven by the feed means and processing means respectively and the analog system consists of impedances connected in series with the output of each tachometer, the impedance being representative of the length of continuous linear material between processings.

9. A control circuit for use with a machine for repetitive processing of linear material having feed means, repetitive processing means, and synchronizing means operatively connected to and adapted for automatically and continuously adjusting the relative speeds of the feed and processing means, comprising a feed means tachometer generator for association with the feed means to produce a direct current output proportional to the speed of the feed means, a processing means tachometer generator for association with the repetitive processing means to produce a direct current output proportional to the speed of the processing means, resistances in a closed loop circuit with each tachometer generator to simulate different lengths of material between comparison terminals in each of said loops, comparison means coupled to each of the terminals to compare the voltages at the respective terminals and produce an error signal if the voltage differs from a predetermined voltage difference and correction means connected to the comparison means and connectable to the synchronizing means for adjusting the relative speeds whereby the correction means drives said synchronizing means in order to correct the relative speed.

10. The system of claim 9 in which at least one of said resistances representative of length of material between processings is variable to simulate different lengths of material between processing whereby adjustment of the value of the resistance will automatically adjust the length of material between processing.

References Cited by the Examiner

UNITED STATES PATENTS

| | | | |
|---|---|---|---|
| 2,050,315 | 8/36 | Gulliksen | 83—75 |
| 2,075,095 | 3/37 | Cordes. | |
| 2,080,575 | 5/37 | Perry | 83—75 |
| 2,082,705 | 6/37 | Logan. | |
| 2,187,091 | 1/40 | Morgan | 83—76 |
| 2,469,706 | 5/49 | Winther. | |
| 2,583,580 | 1/52 | Ludwig. | |
| 2,599,430 | 6/52 | Beuerman | 83—76 |
| 2,628,556 | 2/53 | Fay. | |
| 2,707,027 | 4/55 | Brown | 83—75 |
| 2,812,938 | 11/57 | Haskin. | |
| 2,969,489 | 1/61 | Spencer et al. | |
| 2,995,968 | 8/61 | Touberg | 83—76 |
| 3,029,675 | 4/62 | Alexander et al. | 83—76 |
| 3,071,999 | 1/63 | Thorn | 83—76 |
| 3,084,579 | 4/63 | Melville | 83—299 |

FOREIGN PATENTS 304,212   9/29   Great Britain.

ANDREW R. JUHASZ, *Primary Examiner.*

WILLIAM F. PURDY, JR., CARL W. TOMLIN, WILLIAM W. DYER, JR., HUNTER C. BOURNE, JR.,
*Examiners.*